April 4, 1967

E. DE BOER 3,312,911

TUNNEL DIODE RELAXATION OSCILLATOR

Filed Jan. 7, 1964

INVENTOR.
EELTJE DE BOER
BY
Frank R. Trifari
AGENT 3,312,911
TUNNEL DIODE RELAXATION OSCILLATOR
Eeltje de Boer, Emmasingel, Eindhoven, Netherlands, assignor to North American Philips Company, Inc., New York, N.Y., a corporation of Delaware
Filed Jan. 7, 1964, Ser. No. 336,304
Claims priority, application Netherlands, Jan. 15, 1963, 287,808
18 Claims. (Cl. 331—107)

The invention relates to a circuit arrangement for producing relaxation oscillations by means of a dipole element having a static current-voltage characteristic curve in the form of an N, for example, a tunnel diode, in which in series with the dipole element there is arranged an inductor.

Such an arrangement is known. The supply source of the known arrangement is formed by a source of constant voltage. The relaxation oscillations are derived from the dipole element, which is connected in series with the inductor. This simple arrangement has the disadvantage that only pulses of one polarity can be obtained.

The invention has for its object to provide a relaxation oscillator in which the polarity of the produced relaxation oscillations can be chosen at will. It is characterized in that in series with the dipole element there is connected a second dipole element, and in that viewed from the supply voltage source the two dipole elements are adjusted in that part of their current-voltage characteristic curves which has a negative slope and in that the series circuit has injected into it an external current at such a point that the dipole elements are connected in parallel for said current.

The polarity of the relaxation oscillations produced across the load depends upon the polarity of the injected current.

According to a further aspect of the invention the load is formed by one of the dipole elements.

According to a further aspect the load constitutes the diagonal of a circuit, the branches of which include the series combination of a direct voltage source, an inductor and a dipole element.

According to a further aspect one of the terminals of one dipole element is directly connected to a terminal of the other dipole element and the injected current is supplied to the junction.

Figure 1:
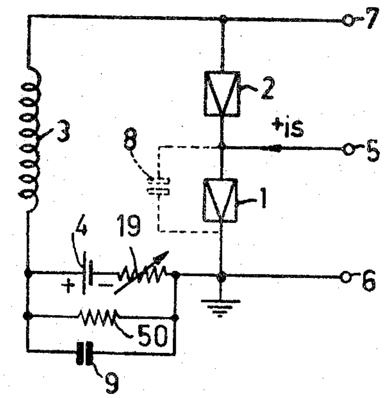
Figure 2:
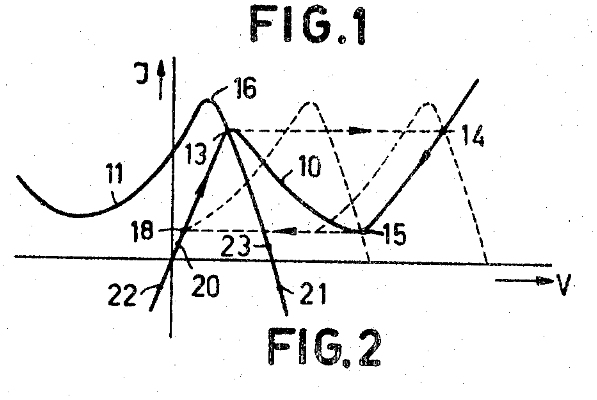
Figure 3:
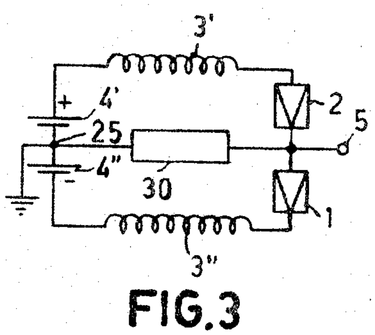
Figure 4:
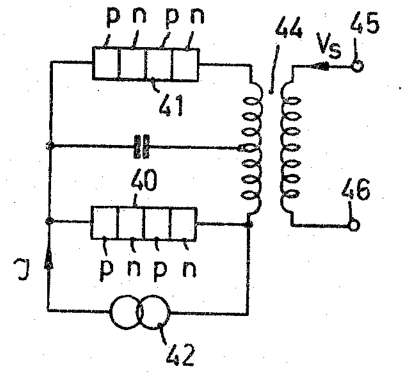

The invention will be described more fully with reference to the drawing, in which FIGURE 1 shows the principal diagram of a first arrangement according to the invention. FIGURE 2 shows current-voltage characteristic curves for explaining the operation of the arrangement shown in FIGURE 1. FIGURE 3 shows the principal diagram of a second arrangement according to the invention and FIGURE 4 shows the dual arrangement of FIGURE 1.

Referring to FIGURE 1, the series combination of tunnel diodes 1 and 2 is connected to the series combination of an inductor 3 and a constant-voltage source 4. The tunnel diodes are each arranged so that, when connected to the battery 4, they operate in that part of their current-voltage characteristic curve which has a negative slope. The biasing of the tunnel diodes is obtained by means of a resistance 50 of compartively low value connected across the series combination of the voltage source 4 and a variable resistance 19. When the battery voltage is applied, each of the two tunnel diodes will operate in the part of the current-voltage characteristic curve starting from the origin. If the peak current $I_p$ of the tunnel diode 1 is slightly lower (for example a fraction of one milliampere, when the peak current is a few milliamperes) than that of the tunnel diode 2, the peak 13 of the current-voltage characteristic curve 10 of the tunnel diode 1 (see FIGURE 2) will be reached earlier than the peak 16 of the current-voltage characteristic curve 11 of the tunnel diode 2.

If the voltage across the tunnel diode 1 further increases, the arrangement becomes unstable. The inductor 3 tends to keep the current across the tunnel diode 1 constant, since it operates as a voltage source which tends to counteract the cause from which it arises. The adjustment of the tunnel diode 1 leaps to point 14. Then the part of the characteristic curve is traversed between the point 14 and the valley point 15 within a time which is mainly determined by the magnitude of the inductor 3 and the differential resistance of the tunnel diode 1. At the valley point 15 the arrangement again becomes unstable. The inductor 3 again tends to keep the current constant and the adjustment of the tunnel diode 1 leaps to point 18. At this point the cycle described above is repeated.

The choice of the tunnel diode across which the relaxation pulses are produced is not a random choice, but it is determined in accordance with the invention by a suitable choice of a control-current supplied to the junction 5 of the tunnel diodes 1 and 2.

If a positive current $+i_s$ is supplied to the junction 5, this current is distributed among the tunnel diodes 1 and 2. For the tunnel diode 1 the partial current has such a polarity that the diode is adjusted to the positive current region, for example, at point 20. For the tunnel diode 2 the partial current has a polarity which adjusts the diode to the negative current region, for example, at point 21. When the battery 4 is connected and when the peak currents of the two tunnel diodes are substantially equal, the peak 13 of the characteristic curve 10 will be reached first so that pulses are produced across the tunnel diode 1, i.e., between the terminals 5 and 6.

If a negative current $-i_s$ is applied to the junction 5, the tunnel diode 1 is adjusted to the negative region, for example, to point 22 and the tunnel diode 2 will be adjusted to the positive current region, for example, to point 23. When the voltage of the source 4 is applied, pulses are produced across the tunnel diode 2, i.e. between the terminals 5 and 7.

In a given embodiment, elements 1 and 2 were germanium tunnel diodes of an experimental type having a peak current of about 5 ma. and an associated voltage of 60 mv. The valley current was 0.5 ma. and the associated voltage was 350 mv. The coil coil 3 had a value of 1 $\mu$h. The series connection of the battery 4 and the variable resistance 19 supplied a voltage of 160 mv., the battery 4 having a terminal voltage of 4 volts and the variable resistance 19 having a value of about 120 ohms. The resistance 50 was 5 ohms. The decoupling capacitor 9 was 1 pf. The natural capacitance of the tunnel diodes 1 and 2 was about 2 pf. If positive or negative currents of 5 $\mu$a. were applied to the junction 5, pulses were produced across the tunnel diodes 1 and 2 of a magnitude of 450 mv. with a repetition frequency of 5 mc./s.

In a variant of the arrangement according to FIG. 1, shown in FIG. 3, the pulses are derived from across a load 30 which is connected between the ground terminal 25 and the junction of the tunnel diodes 1 and 2. When a positive current is supplied to the junction 5, positive pulses are produced across the load 30. When a negative current is fed to the junction 5, negative pulses are produced across the load 30.

Negative or positive pulses of approximately half the value of those produced by the arrangement shown in FIG. 1 could be derived from the load 30 when the same type of tunnel diodes was used, the inductor 3′–3″ had a value of 0.5 $\mu$h, and the voltage source 4′–4″ had a value of 80 mv.

If in any of the said arrangements the voltage 4, or 4′ and 4″, is chosen lower than the voltage associated with the peak current of the tunnel diodes 1 and 2, the so-called three-state arrangement is obtained. In this case if the input current $i_s$ is not present at the junction 5 of the tunnel diodes, the output voltage is zero. If a positive input current $i_s$ is available, one positive pulse is supplied (the cycle 18, 13, 14, 15, 18 is traversed once) and if there is a negative input current $i_s$, one negative pulse is delivered.

Instead of using dipole elements having a static current-voltage characteristic curve in the shape of an N, use may be made of dipole elements having a static current-voltage characteristic curve in the form of an S. Such elements are, for example gas discharge tubes or pnpn-transistors.

The polarity of the voltage pulses derived from the last-mentioned dipole elements is the same as that of the voltage pulses supplied to the dipole elements.

FIG. 4 shows the dual arrangement of FIG. 1. The dipole elements are formed by dual elements such as the voltage-operated pnpn-transistors 40 and 41. Element 42 designates a direct current source which biases transistors 40 and 41 into the negative resistance regions of their current-voltage characteristic curve. A capacitor 47 which is similar in function to inductance 3 of FIGURE 1 is connected in parallel with transistor 40. Element 44 is an ideal transformer, to which voltage pulses $V_s$ are fed via the terminals 45 and 46. Transistors 40 and 41 are effectively connected in parallel for the injected current pulses supplied via transformer 44 from the voltage pulses $V_s$ applied at terminals 45 and 46. The output voltage pulses produced between the terminals 45 and 46 are of the same polarity as the input voltage pulses $V_s$.

What is claimed is:

1. A relaxation oscillator circuit comprising first and second negative resistance diodes, inductance means, means connecting said first and second diodes and said inductance means in series circuit relationship, means for applying a voltage to both of said diodes at a level to bias each of said diodes into the negative resistance region of its current-voltage characteristic, means for supplying a control current to said series circuit at a junction such that said diodes are effectively connected in parallel for said current, and output means coupled to said oscillator circuit so as to supply to a load a relaxation oscillation signal of a polarity determined by said control current.

2. A relaxation oscillator circuit comprising a loop circuit, said loop circuit comprising, in series, inductance means and two negative resistance diodes connected to conduct forward current in the same direction, means for applying a quiescent voltage to both of said diodes at a level to bias each of said diodes into the negative resistance region of its respective current-voltage characteristic, and means for supplying a control current to both of said diodes at a junction in said loop circuit such that said diodes are effectively connected in parallel for said current.

3. Apparatus as described in claim 2 further comprising output means connected across one of said diodes for deriving a relaxation oscillation signal.

4. A relaxation oscillator comprising a bridge circuit having first and second branches, each of said branches comprising, in series, a source of direct voltage, an inductance and a negative resistance diode, an electrical load device for deriving a relaxation oscillation signal connected across one pair of diagonal terminals of said bridge circuit, each branch of said bridge circuit being adjusted to bias its respective diode into the negative resistance region of its current-voltage characteristic, and means for supplying a control current to said bridge circuit at a junction such that said diodes are effectively connected in parallel for said current.

5. A relaxation oscillator circuit comprising, a pair of terminals, a first series circuit connected between said terminals comprising a first source of direct voltage, an inductance and a first negative resistance diode, a second series circuit connected between said terminals comprising a second source of direct voltage, a second inductance and a second negative resistance diode, load means connected between said terminals, each of said series circuits being adjusted to bias its respective diode into the negative resistance region of its current-voltage characteristic, and means for supplying a control current to said terminals such that said diodes are connected in parallel for said current.

6. Apparatus as described in claim 5 wherein said first and second series circuits form a closed loop in which said first and second voltage sources and said first and second diodes are connected with the same polarity.

7. Apparatus as described in claim 6 wherein said control current supplying means supply a steady direct current of either positive or negative polarity whereby positive or negative polarity oscillation pulses are produced across said load means in accordance with the polarity of control current supplied.

8. A relaxation oscillation circuit comprising first and second semiconductor diodes each of which exhibits a negative resistance region in the forward direction of its current-voltage characteristic, an inductance, means connecting said inductance and said diodes in series circuit with the same polarity, a source of direct voltage, means for simultaneously applying said direct voltage to said diodes at a level to bias each of said diodes into its said respective negative resistance region, and means for supplying a direct current to a junction point in said series circuit between said diodes such that said diodes are connected in parallel for said current.

9. Apparatus as described in claim 8 wherein said direct current supplying means provide a direct current of either positive or negative polarity, and output means coupled to said diodes thereby to produce relaxation oscillations of either positive or negative polarity in accordance with the polarity of said direct current supplied.

10. A relaxation oscillator circuit comprising first and second tunnel diodes each of which exhibits a negative resistance region in its current-voltage characteristic, an inductance, means connecting said inductance and said diodes in series circuit, means for applying a bias voltage to both of said diodes at a level to operate each of said diodes in said negative resistance region, and means for supplying a steady control current to both diodes so as to simultaneously drive one diode in the forward bias direction and the other in the reverse bias direction.

11. Apparatus as described in claim 10 wherein said control current supplying means provide a direct current of either positive or negative polarity, and output means connected across said diodes whereby relaxation oscillations of either positive or negative polarity are produced in accordance with the polarity of said direct current supplied.

12. A relaxation oscillator circuit comprising a source of direct voltage, an inductance, first and second negative resistance diodes, means connecting said voltage source, said inductance, and said first and second diodes in series circuit so as to provide a junction point between said diodes, said diodes being connected with the same polarity, means for selectively supplying a direct current of either positive or negative polarity to said junction point so as to simultaneously drive one diode in the forward bias direction and the other diode in the reverse bias direction, and output means coupled to said diodes thereby to produce relaxation oscillations of either positive or negative polarity in accordance with the polarity of said direct current supplied.

13. Apparatus as described in claim 12 wherein the anode of one diode is directly connected to the cathode of the other diode to form said junction point.

14. A tri-stable circuit comprising, in series, an inductance and two tunnel diodes connected with the same polarity, each of said diodes being switchable between a stable low voltage state and a stable high voltage state, means for applying a direct voltage to both of said diodes at a level to bias each of said diodes into its respective low voltage state, and means for selectively feeding a direct current of either positive or negative polarity to both of said diodes simultaneously so as to drive one diode toward its high state and simultaneously drive the other diode away from its high state.

15. A relaxation oscillator circuit comprising first and second two-terminal semiconductor devices of the type having four consecutively arranged adjacent regions of alternating P and N conductivity type which exhibits a generally S-shaped current-voltage characteristic having a negative resistance region, a transformer having first and second windings, means connecting said first winding and said first and second semiconductor devices in series circuit with the same polarity, a source of current, means connecting said current source to said semiconductor devices so as to normally bias said devices into their respective negative resistance regions, and means for applying voltage pulses to said second winding.

16. A relaxation oscillator circuit comprising a pair of two-terminal devices each of which exhibits a negative resistance region in its current-voltage characteristic, inductance means, means connecting said inductance means and said pair of devices in series circuit relationship, means for applying a direct voltage to both of said devices at a level to bias each of same into the said negative resistance region, and means for supplying a control current to said series circuit at a junction such that said two-terminal devices are connected in parallel for said current.

17. A relaxation oscillator circuit comprising a pair of two-terminal devices each of which exhibits a negative resistance region in its current-voltage characteristic, reactance means, means connecting said pair of devices in a series circuit, means connecting said reactance means across at least one of said two-terminal devices, means for applying a direct bias voltage to both of said devices at a level to bias each of same into the said negative resistance region, and means for supplying a control current to both of said devices so as to simultaneously drive one device in the forward bias direction and the other in the reverse bias direction.

18. Apparatus as described in claim 17, wherein said reactance means comprises a capacitor.

References Cited by the Examiner

UNITED STATES PATENTS

| | | | |
|---|---|---|---|
| 3,054,071 | 9/1962 | Tiemann | 331—107 |
| 3,056,048 | 9/1962 | McGrogan | 307—88.5 |
| 3,087,123 | 4/1963 | Rubenstein et al. | 331—107 |
| 3,127,574 | 3/1964 | Sommers | 307—88.5 |
| 3,158,841 | 11/1964 | Li | 307—88.5 |
| 3,207,914 | 9/1965 | Mabuchi | 307—88.5 |

OTHER REFERENCES

Samusenko, RCA Tech., Note 514, March 1962, 3 sheets.

ROY LAKE, *Primary Examiner.*

JOHN KOMINSKI, *Examiner.*